United States Patent
Manmohan (10) Patent No.: US 9,027,078 B1
(45) Date of Patent: May 5, 2015

(54) SYSTEMS AND METHODS FOR ENFORCING DATA LOSS PREVENTION POLICIES ON SANDBOXED APPLICATIONS

(71) Applicant: Symantec Corporation, Mountain View, CA (US)

(72) Inventor: Sarin Sumit Manmohan, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 70 days.

(21) Appl. No.: 13/903,958

(22) Filed: May 28, 2013

(51) Int. Cl.
  *G06F 21/00* (2013.01)
  *G06F 21/60* (2013.01)

(52) U.S. Cl.
  CPC .................................. *G06F 21/60* (2013.01)

(58) Field of Classification Search
  CPC ........................................................ G06F 21/60
  USPC ............................................................. 726/1
  See application file for complete search history.

(56) References Cited

U.S. PATENT DOCUMENTS

| | | | | |
|---|---|---|---|---|
| 7,096,501 | B2 * | 8/2006 | Kouznetsov et al. | 726/24 |
| 7,716,240 | B2 * | 5/2010 | Lim | 707/781 |
| 8,613,040 | B2 * | 12/2013 | Barile | 726/1 |
| 8,656,455 | B1 * | 2/2014 | Bailey et al. | 726/1 |
| 8,670,146 | B1 * | 3/2014 | Van Couvering | 358/1.15 |
| 8,671,080 | B1 * | 3/2014 | Upadhyay et al. | 707/674 |
| 8,726,396 | B1 * | 5/2014 | Dodke | 726/26 |
| 8,732,568 | B1 * | 5/2014 | Mullangath | 715/200 |
| 8,751,568 | B1 * | 6/2014 | Mears | 709/203 |
| 8,752,180 | B2 * | 6/2014 | Barile et al. | 726/25 |
| 8,844,059 | B1 * | 9/2014 | Manmohan | 726/32 |
| 2003/0079145 | A1 * | 4/2003 | Kouznetsov et al. | 713/200 |
| 2005/0182964 | A1 * | 8/2005 | Jooste | 713/200 |
| 2008/0016339 | A1 * | 1/2008 | Shukla | 713/164 |
| 2008/0127292 | A1 * | 5/2008 | Cooper et al. | 726/1 |
| 2010/0162347 | A1 * | 6/2010 | Barile | 726/1 |
| 2010/0299759 | A1 * | 11/2010 | Kim et al. | 726/28 |
| 2011/0179483 | A1 * | 7/2011 | Paterson et al. | 726/22 |
| 2012/0106366 | A1 * | 5/2012 | Gauvin | 370/252 |
| 2012/0131012 | A1 * | 5/2012 | Taylor et al. | 707/748 |
| 2012/0151551 | A1 * | 6/2012 | Readshaw et al. | 726/1 |
| 2012/0185863 | A1 * | 7/2012 | Krstic et al. | 718/104 |
| 2012/0204260 | A1 * | 8/2012 | Cecil et al. | 726/22 |
| 2012/0291087 | A1 * | 11/2012 | Agrawal | 726/1 |
| 2013/0055337 | A1 * | 2/2013 | Choi et al. | 726/1 |
| 2013/0055341 | A1 * | 2/2013 | Cooper et al. | 726/1 |
| 2013/0055342 | A1 * | 2/2013 | Choi et al. | 726/1 |
| 2013/0283344 | A1 * | 10/2013 | Krstic et al. | 726/1 |
| 2014/0237537 | A1 * | 8/2014 | Manmohan et al. | 726/1 |
| 2014/0379673 | A1 * | 12/2014 | Lim | 707/694 |

* cited by examiner

*Primary Examiner* — David Garcia Cervetti (74) *Attorney, Agent, or Firm* — ALG Intellectual Property, LLC (57) ABSTRACT

A computer-implemented method for enforcing data loss prevention policies on sandboxed applications may include identifying an application process that is in a sandbox, wherein a broker process has created a file handle for a file on behalf of the application process within the sandbox, intercepting an input/output request performed on the file handle by the application process, wherein the input/output request comprises an identifier of the application process, extracting the identifier of the application process from the input/output request and enforcing a data loss prevention policy on the file by attributing the input/output request to the application process instead of to the broker process based on the identifier of the application process. Various other methods, systems, and computer-readable media are also disclosed.

20 Claims, 7 Drawing Sheets

SYSTEMS AND METHODS FOR ENFORCING DATA LOSS PREVENTION POLICIES ON SANDBOXED APPLICATIONS

BACKGROUND

Corporate networks are often filled with sensitive data in the form of confidential emails, company-private documents, personally identifying information, financial information, and more. Ensuring that this data is kept secure may be very important for both a company's reputation and for its success. Companies may have data loss prevention (DLP) policies to ensure that sensitive data is handled correctly. DLP policies may include different rules for different applications. A document editor may be allowed to access files that a file transfer program may be denied access to. In order to enforce DLP policies correctly, it may be very important to differentiate between applications.

Many computing devices now feature sandboxes, applications which isolate other applications from the main operating system. Sandboxes may have many benefits, but they may also obscure which application is accessing a file. Traditional systems for enforcing DLP policies may not be capable of differentiating between applications within a sandbox, and as a result, may incorrectly enforce DLP rules on sandboxed applications. Accordingly, the instant disclosure identifies and addresses a need for additional and improved systems and methods for enforcing data loss prevention policies on sandboxed applications.

SUMMARY

As will be described in greater detail below, the instant disclosure generally relates to systems and methods for enforcing data loss prevention policies on sandboxed applications by identifying a sandboxed application process with a file handle created by a broker process, intercepting an input/output (I/O) request performed on the file handle, extracting an identifier of the application process from the I/O request, and enforcing a DLP policy based on the identifier.

In one example, a computer-implemented method for enforcing data loss prevention policies on sandboxed applications may include (1) identifying an application process that may be in a sandbox, wherein a broker process may have created a file handle for a file on behalf of the application process within the sandbox, (2) intercepting an input/output request performed on the file handle by the application process, wherein the input/output request may include an identifier of the application process, (3) extracting the identifier of the application process from the input/output request, and (4) enforcing a data loss prevention policy on the file by attributing the input/output request to the application process instead of to the broker process based on the identifier of the application process.

In one embodiment, the computer-implemented method may further include (1) storing, in metadata about the file, an identifier of the broker process after the broker process may have created the file handle and/or (2) updating the metadata about the file with the identifier of the application process after intercepting the input/output request.

In some examples, intercepting the input/output request performed on the file handle may be in response to determining that the application process may be in the sandbox.

In some examples, enforcing the data loss prevention policy may include (1) blocking an attempt to read from a memory-mapped file that corresponds to the file, (2) updating metadata about the file with information about the attempt to read from the memory-mapped file, and (3) blocking a read attempt on the file based on the metadata about the file with information about the attempt to read from the memory-mapped file which may have been blocked.

In some examples, the computer-implemented method may further include extracting a security context for the application process from the input/output request.

In one embodiment, the broker process may have created the file handle by at least one of (1) opening the file and/or (2) creating the file.

In one embodiment, the input/output request may include at least one of (1) a request to read from the file and/or (2) a request to write to the file.

In some examples, intercepting the input/output request may include intercepting a write request performed on the file handle by the application process, wherein enforcing the data loss prevention policy on the file may include denying the write request in response to the broker process closing the file.

In some examples, enforcing the data loss prevention policy may include blocking a request by the application process to read the file.

In one embodiment, the application process may fulfill a data loss prevention rule of the data loss prevention policy that the broker process may not fulfill. In addition, enforcing the data loss prevention policy on the file based on the identifier of the application process may include the application process fulfilling the data loss prevention rule.

In one embodiment, the application process may fulfill a data loss prevention rule of the data loss prevention policy that an additional process in the sandbox may not fulfill. In addition, enforcing the data loss prevention policy on the file based on the identifier of the application process may include the application process fulfilling the data loss prevention rule.

In one embodiment, a system for implementing the above-described method may include (1) an identification module that identifies an application process that may be in a sandbox, wherein a broker process may have created a file handle for a file on behalf of the application process within the sandbox, (2) an interception module that intercepts an input/output request performed on the file handle by the application process, wherein the input/output request may include an identifier of the application process, (3) an extraction module that extracts the identifier of the application process from the input/output request, (4) an enforcement module that enforces a data loss prevention policy on the file by attributing the input/output request to the application process instead of to the broker process based on the identifier of the application process, and (5) at least one processor configured to execute the identification module, the interception module, the extraction module and the enforcement module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify an application process that may be in a sandbox, wherein a broker process may have created a file handle for a file on behalf of the application process within the sandbox, (2) intercept an input/output request performed on the file handle by the application process, wherein the input/output request may include an identifier of the application process, (3) extract the identifier of the application process from the input/output request, and (4) enforce a data loss prevention policy on the file by attributing the input/output request to the application process instead of to the broker process based on the identifier of the application process.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for enforcing data loss prevention policies on sandboxed applications. As will be explained in greater detail below, by extracting an identifier from a read or write request instead of a file open or close request, the systems described herein can determine which application in a sandbox may be actually accessing a file and can therefore make more accurate and fine-grained DLP determinations.

The following will provide, with reference to FIGS. 1-2 and 4-5, detailed descriptions of exemplary systems for enforcing data loss prevention policies on sandboxed applications. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
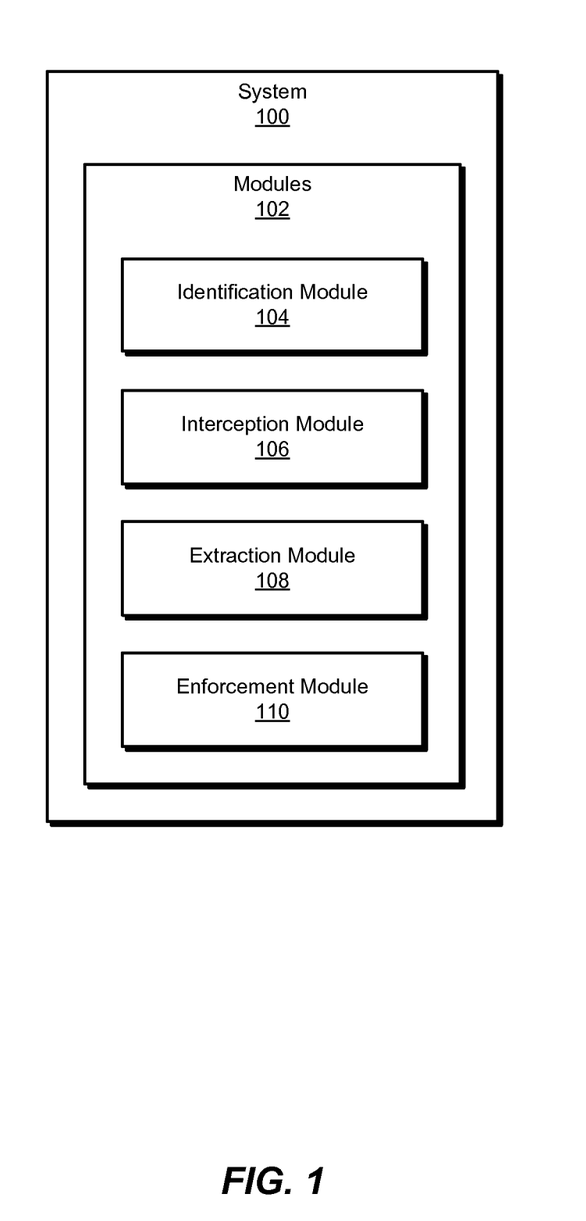
FIG. 1 is a block diagram of an exemplary system for enforcing data loss prevention policies on sandboxed applications.

FIG. 1 is a block diagram of exemplary system 100 for enforcing data loss prevention policies on sandboxed applications. As illustrated in this figure, exemplary system 100 may include one or more modules 102 for performing one or more tasks. For example, and as will be explained in greater detail below, exemplary system 100 may include an identification module 104 that may identify an application process that may be in a sandbox, wherein a broker process may have created a file handle for a file on behalf of the application process within the sandbox. Exemplary system 100 may additionally include an interception module 106 that may intercept an input/output request performed on the file handle by the application process, wherein the input/output request may include an identifier of the application process. Exemplary system 100 may also include an extraction module 108 that may extract the identifier of the application process from the input/output request. Exemplary system 100 may additionally include an enforcement module 110 that may enforce a data loss prevention policy on the file by attributing the input/output request to the application process instead of to the broker process based on the identifier of the application process. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
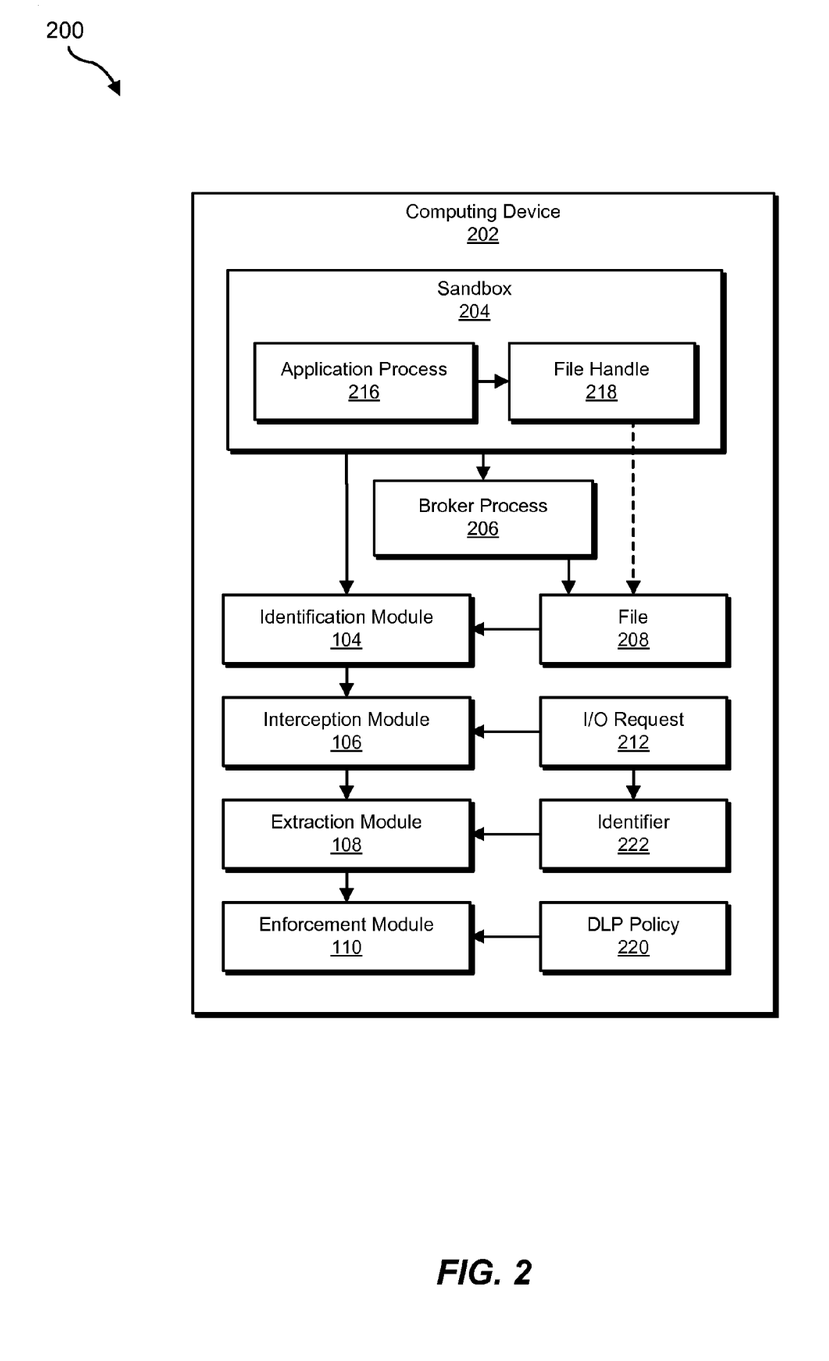
FIG. 2 is a block diagram of an exemplary system for enforcing data loss prevention policies on sandboxed applications.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. Computing device 202 may be programmed with one or more of modules.

In one embodiment, one or more of modules 102 from FIG. 1 may, when executed by at least one processor of computing device 202, facilitate computing device 202 in enforcing data loss prevention policies on sandboxed applications. For example, and as will be described in greater detail below, one or more of modules 102 may cause computing device 202 to enforcing data loss prevention policies on sandboxed applications. For example, and as will be described in greater detail below, identification module 104 may be programmed to identify an application process 216 that may be in a sandbox 204, wherein a broker process 206 may have created a file handle 218 for a file 208 on behalf of application process 216 within sandbox 204. Interception module 106 may be programmed to intercept an I/O request 212 performed on file handle 218 by application process 216, wherein I/O request 212 may include an identifier 222. Extraction module 108 may be programmed to extract identifier 222 from I/O request 212. Enforcement module 110 may be programmed to enforce a DLP policy 220 on file 208 by attributing I/O request 212 to application process 216 instead of to broker process 206 based on identifier 222.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Figure 3:
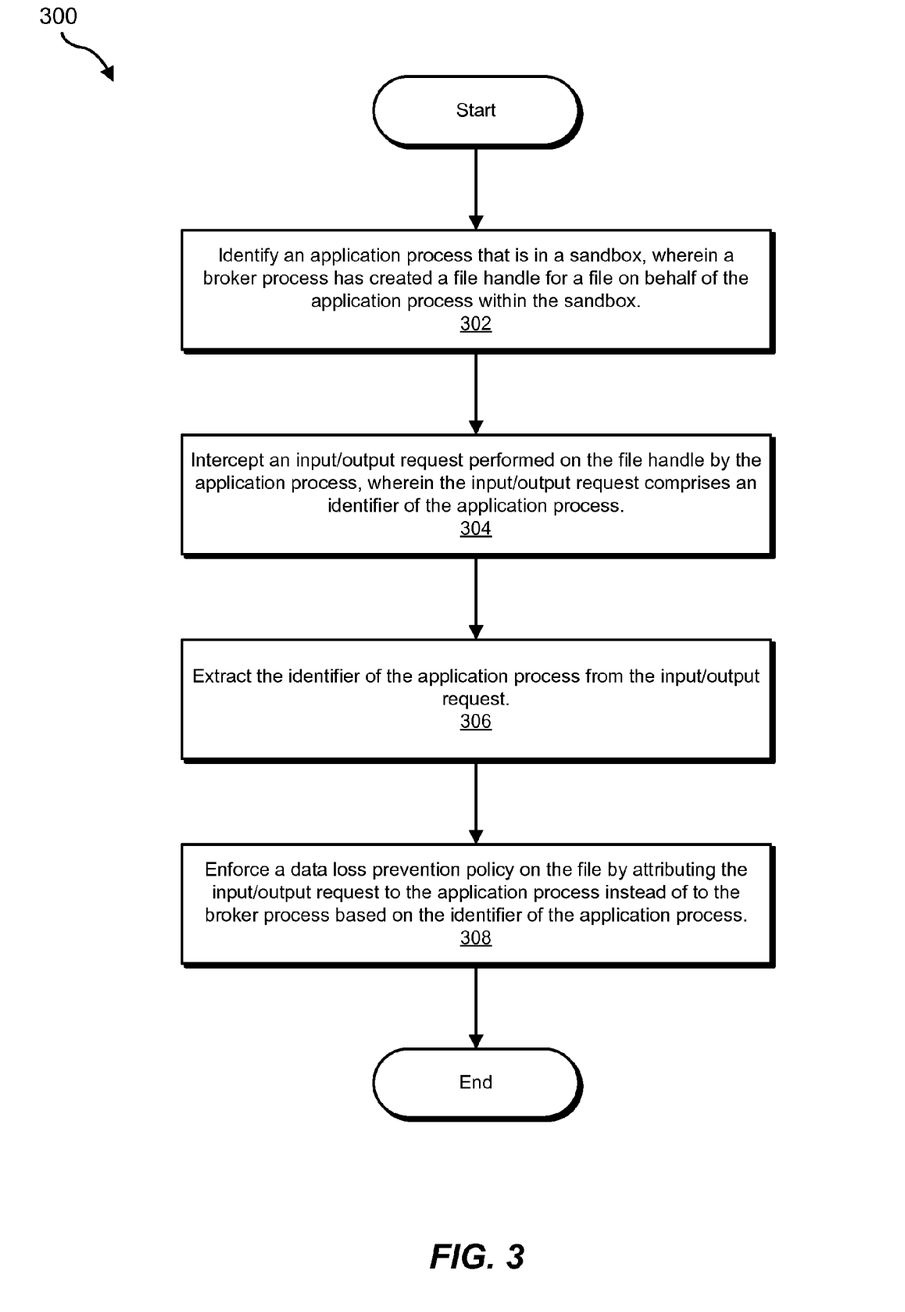
FIG. 3 is a flow diagram of an exemplary method for enforcing data loss prevention policies on sandboxed applications.

FIG. 3 is a flow diagram of an exemplary computer-implemented method 300 for enforcing data loss prevention policies on sandboxed applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify an application process that is in a sandbox, wherein a broker process has created a file handle for a file on behalf of the application process within the sandbox. For example, at step 302 identification module 104 may, as part of computing device 202 in FIG. 2, identify an application process 216 that is in a sandbox 204, wherein a broker process 206 has created a file handle 218 for a file 208 on behalf of application process 216 within sandbox 204.

For example, identification module 104 may identify an application that may be running in a sandbox. The broker process may have created a file handle for a document on behalf of the application in the sandbox.

In one example, identification module 104 may identify a document editor that may be running in a WINDOWS 8 sandbox. In this example, the sandbox broker process may have created a file handle for a text document on behalf of the document editor.

As used herein, the term "sandbox" generally refers to an isolated computing environment that may provide limitations on what system resources an application may request or access. In some examples, a sandbox broker may include a privilege controller and may allow sandboxed processes indirect and/or secure access to system resources based on specified policies. In some examples, a sandbox may include only one application, as in the case of an applet. Examples of sandboxes include, without limitation, WINDOWS 8 RUNTIME and/or CHROMIUM SANDBOX.

In some examples, the broker process may have created the file handle by opening the file and/or creating the file. For example, a user may attempt to create a new file using a document editor in WINDOWS 8 RUNTIME. The broker process may create a new file, open the file, and/or create a file handle that the broker process may then pass to the document editor in the sandbox.

At step 304, one or more of the systems described herein may intercept an input/output request performed on the file handle by the application process, wherein the input/output request may include an identifier of the application process. For example, at step 304 interception module 106 may, as part of computing device 202 in FIG. 2, intercept an I/O request 212 performed on file handle 218 by application process 216, wherein I/O request 212 may include an identifier 222.

For example, interception module 106 may intercept an I/O request performed on the file handle of the document. The I/O request may include a process identifier for the sandboxed application.

In one example, interception module 106 may intercept an attempt to write text to the document by the document editor. The write attempt may include the process ID of the document editor.

Examples of the identifier for the application include, but are not limited to, the process ID of the application, the security context of the application, the kernel data structure of the application, and/or the process token of the application.

In some examples, the input/output request may include a request to read from the file and/or a request to write to the file. For example, the document editor may attempt to read from an open document. In another example, the document editor may attempt to write text to a document.

In some examples, interception module 106 may intercept the input/output request performed on the file handle in response to determining that the application process may be in the sandbox. For example, interception module 106 may determine, by examining attributes of the application process, that the process may be in the sandbox. In one example, interception module 106 may examine the process ID of the document editor and determine that it is different from the process ID of the process that opened the document, which suggests that the document editor may be sandboxed.

At step 306, one or more of the systems described herein may extract the identifier of the application process from the input/output request. For example, at step 306 extraction module 108 may, as part of computing device 202 in FIG. 2, extract identifier 222 from I/O request 212.

For example, extraction module 108 may extract an identifier of the sandboxed application from the I/O request performed on the file handle for the document. In one example, extraction module 108 may extract the process ID for the document editor from the request to write text to the document.

In some examples, extraction module 108 may extract a security context for the application process from the input/output request. For example, extraction module 108 may extract a security context for the document editor from the write request. The security context may include information about the privileges of the current user, file and/or the application. The security context may also include DLP policy information.

At step 308, one or more of the systems described herein may enforce a data loss prevention policy on the file by attributing the input/output request to the application process instead of to the broker process based on the identifier of the application process. For example, at step 308 enforcement module 110 may, as part of computing device 202 in FIG. 2, enforce a DLP policy 220 on file 208 by attributing I/O request 212 to application process 216 instead of to broker process 206 based on identifier 222.

For example, enforcement module 110 may enforce a DLP policy on the file by accurately attributing the I/O request to the sandboxed application instead of the broker process, based on the identifier of the sandboxed application.

In one example, enforcement module 110 may enforce a DLP policy on the document by attributing the write request to the document editor instead of to the broker process. For example, the sandboxed document editor may be attempting to save the file to removable media and may not be allowed to under the DLP policy, while the broker process may be allowed to save files to removable media. Enforcement module 110 may block the write request to the removable media based on correctly attributing the write request to the sandboxed document editor.

As used herein, the term "data loss prevention" generally refers to any system designed to detect and/or prevent potential data breaches. DLP systems may act on data which may be in use, in motion, and/or at rest. DLP systems may include policies about the storage and/or transmission of data, software configured to enforce DLP policies, physical enforcement of DLP policies, and/or hardware modifications that may prevent the transmission of data. Examples of DLP policies may include, without limitation, "employees may not bring storage media into the office," "all laptops must be locked when not in use," "personally identifying information may not be emailed," and/or "all confidential data must be encrypted." Examples of DLP enforcement may include, without limitation, removing USB ports from company devices, filtering outgoing emails to detect sensitive data, preventing access to sensitive data while devices are on unsecured networks, and/or encrypting data on computing devices.

In some embodiments, the systems described herein may store, in metadata about the file, an identifier of the broker process after the broker process has created the file handle and/or update the metadata about the file with the identifier of the application process after intercepting the input/output request. For example, the DLP driver may store the process ID and/or security context of the broker process in metadata when the broker process creates the file handle. In some examples, the process ID of the broker process for the sandbox may have been fingerprinted for later identification. The broker process may have been fingerprinted by its binary name, internal name, and/or publisher information. The DLP driver may then update the metadata with the process ID and/or security context of the sandboxed application when the application makes a read or write request.

Figure 4:
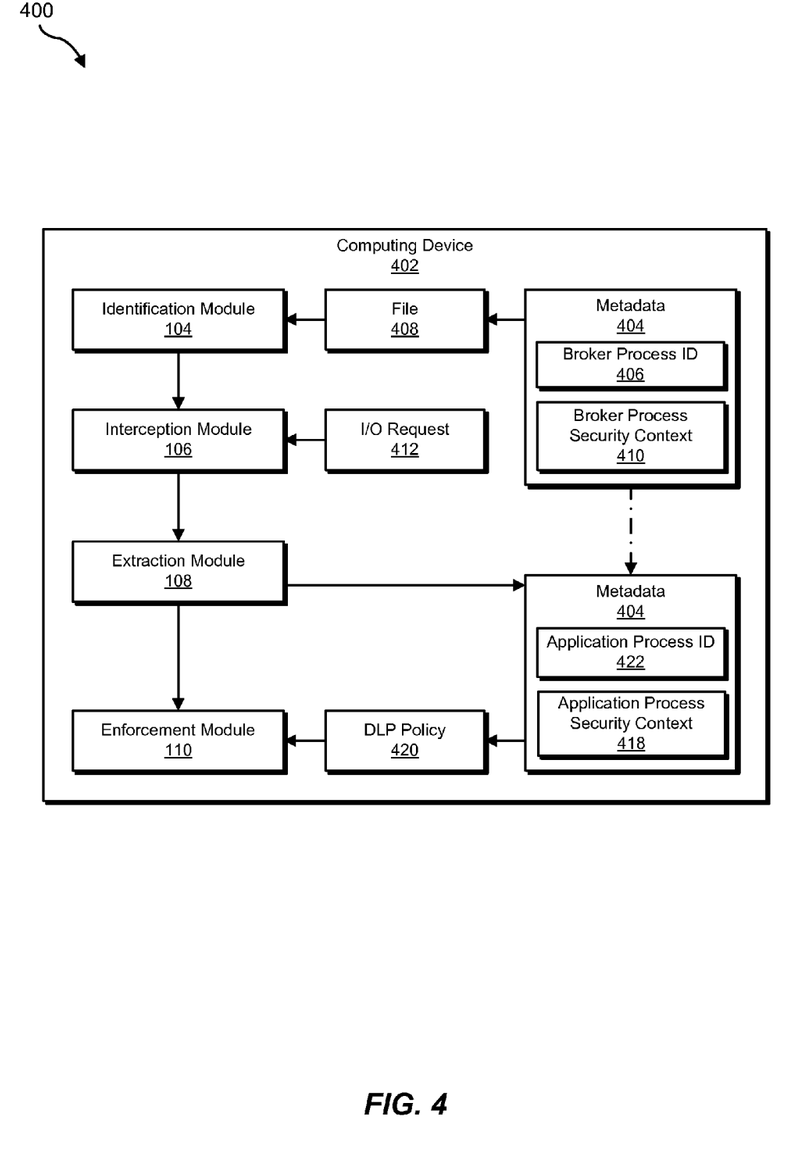
FIG. 4 is a block diagram of an exemplary system for enforcing data loss prevention policies on sandboxed applications.

FIG. 4 is a block diagram of an exemplary computing system 400 for enforcing data loss prevention policies on sandboxed applications. In some embodiments, identification module 104, as part of computing device 402, may identify a file 408. File 408 may have metadata 404, which may include broker process ID 406 and/or broker process security context 416. Interception module 106 may intercept I/O request 412. Extraction module 108 may extract metadata from I/O request 412, and may update metadata 404. Metadata 404 may now include application process ID 422 and/or application process security context 418. Enforcement module 110 may enforce DLP policy 420 based on process ID 422 and/or application process security context 418 in metadata 404.

For example, the DLP driver may identify a document. A broker process may open the document and create a file handle. The DLP driver may update the document's metadata with the process ID of the broker process. A document editor within the sandbox may write data to the document. The DLP driver may update the document's metadata with the process ID of the document editor. The DLP driver may enforce the DLP policy on the document based on the process ID of the document editor that may currently be stored in the metadata instead of the process ID of the broker process that may have been previously stored in the metadata.

In some examples, enforcing the data loss prevention policy may include (1) blocking an attempt to read from a memory-mapped file that corresponds to the file (2) updating metadata about the file with information about the attempt to read from the memory-mapped file, and (3) blocking a read attempt on the file based on the metadata about the file with information about the attempt to read from the memory-mapped file which was blocked. For example, a sandboxed application may use a CreateFileMapping operation to create a memory-mapped file that corresponds to a document file and may attempt to read from the memory-mapped file. The DLP driver may block the CreateFileMapping operation attempt and may update metadata about the document file with the information that an attempt by the sandboxed application was blocked. The sandboxed application may then attempt to read from the document file. The DLP driver may block the read attempt based on the metadata indicating that a previous CreateFileMapping attempt was blocked.

In some examples, the attempt to create the memory-mapped file and/or the attempt to read from the document file may take place in an additional sandbox. In these examples, the DLP driver may still block the create and/or read attempts based on the metadata.

In some examples, interception module 106 may intercept the input/output request by intercepting a write request performed on the file handle by the application process, and/or enforcement module 110 may enforce the data loss prevention policy on the file by denying the write request in response to the broker process (and/or the sandboxed process) closing the file. For example, a computing device may store a plurality of write requests but not modify the file until the file is closed. In some examples, enforcement module 110 may enforce the DLP policy on a write request on a file, based on the security context of the application process making the write request, at the time the broker process closes the file. Even though the broker process for the sandbox may be making the request that triggers the DLP enforcement, the DLP enforcement may be based on the sandboxed application process that originated the write request.

In some examples, enforcement module 110 may enforce the data loss prevention policy by creating an incident report. The incident report may include the identifier of the application, security context of the application, identifier of the broker process, action attempted, file affected, and/or timestamp of the action.

In some examples, enforcement module 110 may enforce the data loss prevention policy by first determining if the file is subject to the DLP policy. For example, if the I/O operation is a CreateFileMapping operation on an executable file, the file may be subject to the DLP policy. If the I/O operation is a CreateFileMapping operation on a document file, the file may be subject to the DLP policy. The file may also be sent to a user mode service to determine if the file includes sensitive information which may be subject to the DLP policy. In some examples, the file's signature and/or extension may be examined in order to determine if the file is subject to the DLP policy.

In some examples, enforcement module 110 may enforce the data loss prevention policy by blocking a request by the application process to read the file. For example, a document editor in a sandbox may attempt to read a file for which the document editor does not have sufficient permissions according to the DLP policy. Enforcement module 110 may block the read request by the document editor.

Figure 5:
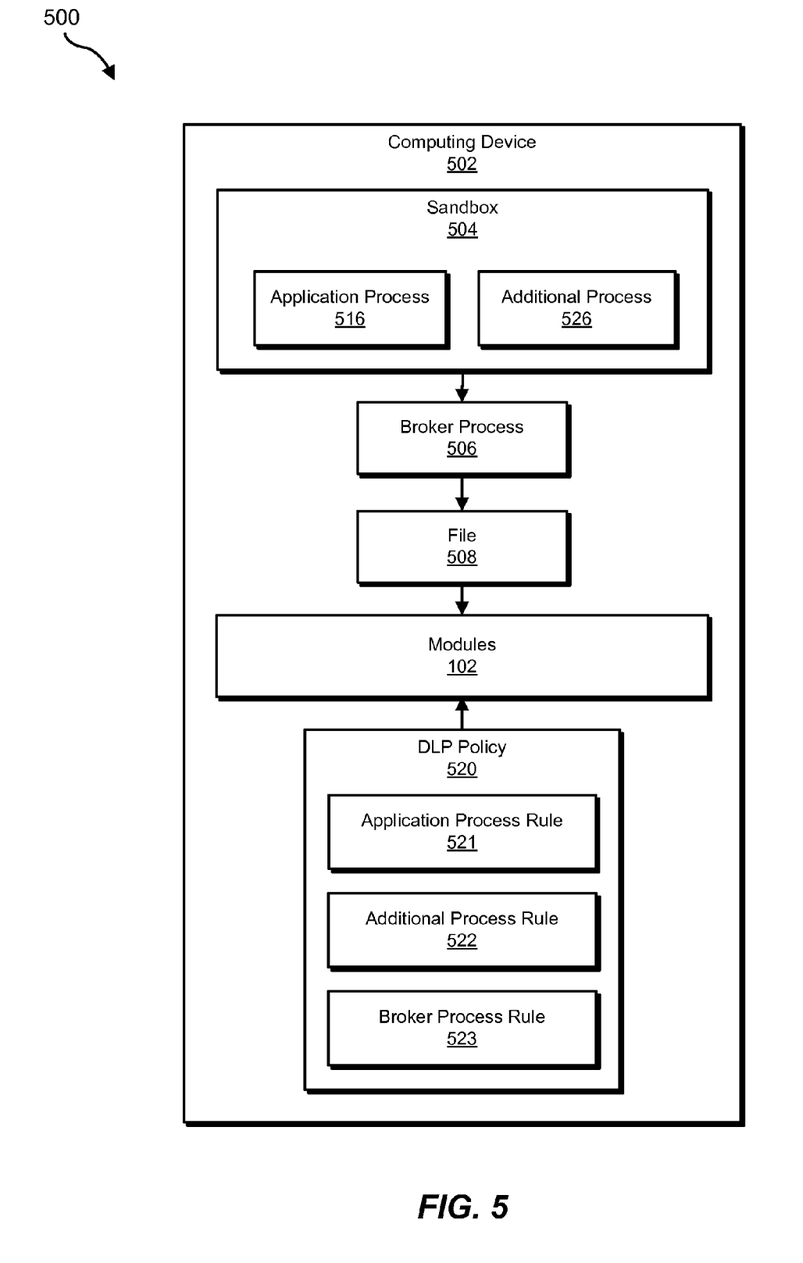
FIG. 5 is a block diagram of an exemplary system for enforcing data loss prevention policies on sandboxed applications.

FIG. 5 is a block diagram of an exemplary computing system 500 for enforcing data loss prevention policies on sandboxed applications. In some examples, sandbox 504 may include application process 516 and/or additional process 526. In some examples, application process 516 and/or process 526 may be included in a separate sandbox. Broker process 506 may open a file handle for file 508 on behalf of processes in sandbox 504. Modules 102 may perform the steps described above using DLP policy 520 for DLP policy enforcement. DLP policy 520 may include application process rule 521, additional process rule 522, and/or broker process rule 523.

In one example, modules 102 may enforce application process rule 521 on file 508 based on application process 516 making an I/O request on file 508. In this example, modules 102 may not enforce broker process rule 523 on file 508. Broker process rule 523 may not apply to application process 516.

In one example, modules 102 may enforce application process rule 521 on file 508 based on application process 516 making an I/O request on file 508. In this example, modules 102 may not enforce additional process rule 522 on file 508. Additional process rule 522 may not apply to application process 516.

In some examples, the application process may fulfill a data loss prevention rule of the data loss prevention policy that the broker process may not fulfill, and/or enforcing the data loss prevention policy on the file based on the identifier of the application process may include the application process fulfilling the data loss prevention rule. For example, the application may be allowed to perform operations that the broker process may not be allowed to perform. In one example, a sandbox broker process may be allowed to modify key system files which an application within the sandbox may not be allowed to modify.

In some examples, the application process may fulfill a data loss prevention rule of the data loss prevention policy that an additional process in the sandbox may not fulfill, and/or enforcing the data loss prevention policy on the file based on the identifier of the application process may include the application process fulfilling the data loss prevention rule. For example, one application within the sandbox may have more permissions than another application within the sandbox. In one example, a document editor may be allowed to modify a sensitive document while an email program may not be allowed access to the sensitive document.

As explained above in connection with method 300 in FIG. 3, the systems described herein may identify a sandboxed application. The sandboxed application may have access to a file handle that may have been created by a broker process for the sandbox. The file handle may have been created as part of a file open and/or file create operation.

The systems described herein may intercept a read and/or write request performed on the file handle by the application, and may extract an identifier of the application from the request. The identifier may include a process ID and/or security context, and may be different from an identifier of the broker process.

The systems described herein may enforce a DLP policy on the file based on the identifier of the application process. The application process may be subject to different DLP rules than the broker process and/or may be subject to different DLP rules than additional applications within the sandbox. The systems described herein may also update metadata about the file with the application identifier and/or DLP enforcement actions, in order to enforce DLP rules on the file without duplicating previous efforts. By enforcing the DLP policy based on the application identifier extracted during a read and/or write operation, the systems described herein may accurately enforce DLP rules on sandboxed applications.

Figure 6:
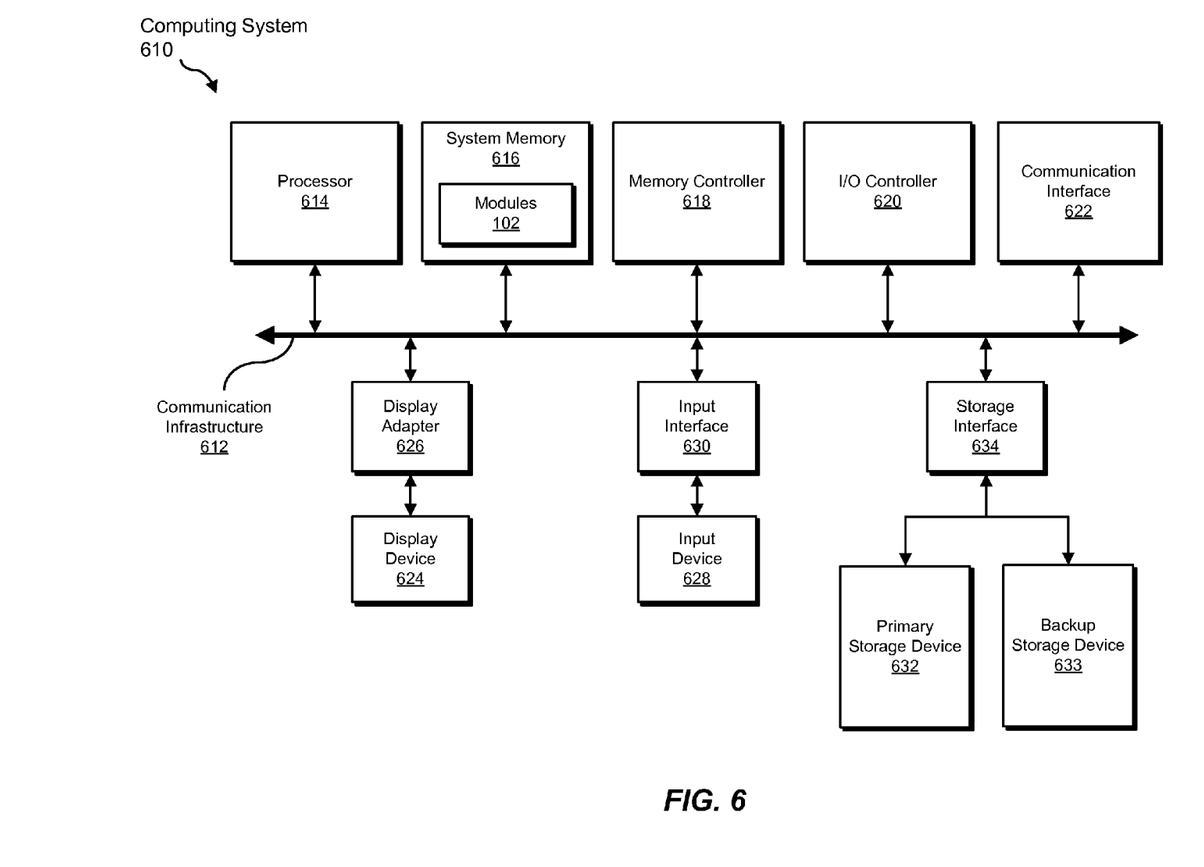
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
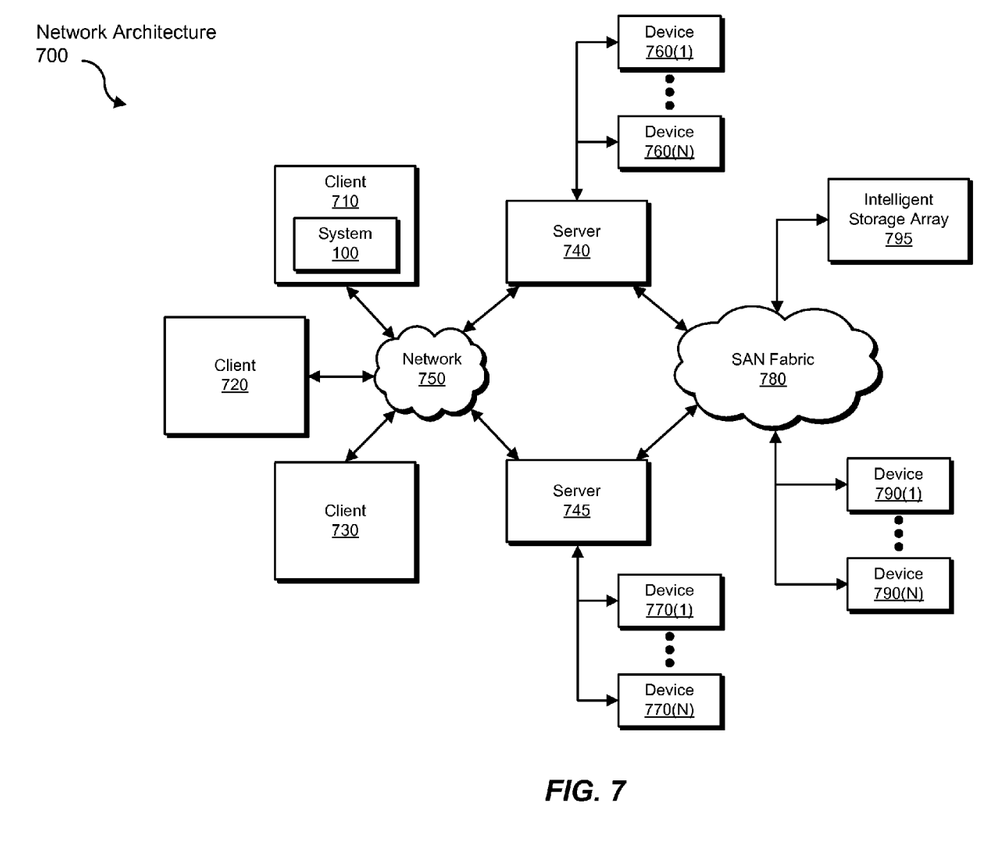
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for enforcing data loss prevention policies on sandboxed applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive file metadata to be transformed, transform the file metadata, output a result of the transformation to a DLP enforcement system, use the result of the transformation to enforce a DLP policy and store the result of the transformation to the file metadata. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enforcing data loss prevention policies on sandboxed applications, at least a portion of the method being performed by a computing device comprising at least one processor, the method comprising:
    identifying, with at least one processor, an application process that is in a sandbox, wherein a broker process has intercepted an attempt by the application process to access a file and, in response, created a file handle for the file on behalf of the application process within the sandbox for the application process to have access to the file via the file handle;
    intercepting, with at least one processor, an input/output request performed on the file handle by the application process, wherein the input/output request comprises an identifier of the application process;
    extracting, with at least one processor, the identifier of the application process from the input/output request;
    enforcing, with at least one processor, a data loss prevention policy on the file by attributing the input/output request to the application process instead of to the broker process based on the identifier of the application process.

2. The computer-implemented method of claim 1, further comprising:
    storing, in metadata about the file, an identifier of the broker process after the broker process has created the file handle;
    updating the metadata about the file with the identifier of the application process after intercepting the input/output request.

3. The computer-implemented method of claim 1, wherein intercepting the input/output request performed on the file handle is in response to determining that the application process is in the sandbox.

4. The computer-implemented method of claim 1, wherein enforcing the data loss prevention policy comprises:
    blocking an attempt to read from a memory-mapped file that corresponds to the file;
    updating metadata about the file with information about the attempt to read from the memory-mapped file;

blocking a read attempt on the file based on the metadata about the file with information about the attempt to read from the memory-mapped file that was blocked.

5. The computer-implemented method of claim 1, further comprising extracting a security context for the application process from the input/output request.

6. The computer-implemented method of claim 1, wherein the broker process created the file handle by at least one of:
opening the file;
creating the file.

7. The computer-implemented method of claim 1, wherein the input/output request comprises at least one of:
a request to read from the file;
a request to write to the file.

8. The computer-implemented method of claim 1, wherein:
intercepting the input/output request comprises intercepting a write request performed on the file handle by the application process;
enforcing the data loss prevention policy on the file comprises denying the write request in response to the broker process closing the file.

9. The computer-implemented method of claim 1, wherein enforcing the data loss prevention policy comprises blocking a request by the application process to read the file.

10. The computer-implemented method of claim 1, wherein:
the application process fulfills a data loss prevention rule of the data loss prevention policy that the broker process does not fulfill;
enforcing the data loss prevention policy on the file based on the identifier of the application process comprises the application process fulfilling the data loss prevention rule.

11. The computer-implemented method of claim 1, wherein:
the application process fulfills a data loss prevention rule of the data loss prevention policy that an additional process in the sandbox does not fulfill;
enforcing the data loss prevention policy on the file based on the identifier of the application process comprises the application process fulfilling the data loss prevention rule.

12. A system for enforcing data loss prevention policies on sandboxed applications, the system comprising:
an identification module that identifies an application process that is in a sandbox, wherein a broker process has intercepted an attempt by the application process to access a file and, in response, created a file handle for the file on behalf of the application process within the sandbox for the application process to have access to the file via the file handle;
an interception module that intercepts an input/output request performed on the file handle by the application process, wherein the input/output request by an identifier of the application process;
an extraction module that extracts the identifier of the application process from the input/output request;
an enforcement module that enforces a data loss prevention policy on the file by attributing the input/output request to the application process instead of to the broker process based on the identifier of the application process;
at least one processor configured to execute the identification module, the interception module, the extraction module and the enforcement module.

13. The system of claim 12, further comprising:
a storing module that stores, in metadata about the file, an identifier of the broker process after the broker process has created the file handle;
an updating module that updates the metadata about the file with the identifier of the application process after intercepting the input/output request.

14. The system of claim 12, wherein the interception module intercepts the input/output request performed on the file handle in response to determining that the application process is in the sandbox.

15. The system of claim 12, wherein the enforcement module enforces the data loss prevention policy by:
blocking an attempt to read from a memory-mapped file that corresponds to the file;
updating metadata about the file with information about the attempt to read from the memory-mapped file;
blocking a read attempt on the file based on the metadata about the file with information about the attempt to read from the memory-mapped file that was blocked.

16. The system of claim 12, the extraction module extracts a security context for the application process from the input/output request.

17. The system of claim 12, wherein the broker process created the file handle by at least one of:
opening the file;
creating the file.

18. The system of claim 12, wherein the input/output request comprises at least one of:
a request to read from the file;
a request to write to the file.

19. The system of claim 12, wherein:
the interception module intercepts the input/output request by intercepting a write request performed on the file handle by the application process;
the enforcement module enforces the data loss prevention policy on the file by denying the write request in response to the broker process closing the file.

20. A non-transitory computer-readable-storage medium comprising one or more computer-readable instructions that, when executed by at least one processor of a computing device, cause the computing device to:
identify an application process that is in a sandbox, wherein a broker process has intercepted an attempt by the application process to access a file and, in response, created a file handle for the file on behalf of the application process within the sandbox for the application process to have access to the file via the file handle;
intercept an input/output request performed on the file handle by the application process, wherein the input/output request comprises an identifier of the application process;
extract the identifier of the application process from the input/output request;
enforce a data loss prevention policy on the file by attributing the input/output request to the application process instead of to the broker process based on the identifier of the application process.

* * * * *